United States Patent
Liu et al.

(10) Patent No.: US 9,628,322 B2
(45) Date of Patent: Apr. 18, 2017

(54) NETWORK SYNCHRONIZATION SYSTEM AND METHOD INVOLVING AUTOMATIC SETTING VIA PHYSICAL LINE

(71) Applicant: D-Link Corporation, Taipei (TW)

(72) Inventors: Ming-Han Liu, Taipei (TW); Stephanie Hung, Taipei (TW); Hsiu-Ju Cheng, Taipei (TW)

(73) Assignee: D-LINK CORPORATION, Taipei (TW)

( * ) Notice: Subject to any disclaimer, the term of this patent is extended or adjusted under 35 U.S.C. 154(b) by 808 days.

(21) Appl. No.: 13/944,034

(22) Filed: Jul. 17, 2013

(65) Prior Publication Data

US 2014/0310383 A1    Oct. 16, 2014

(30) Foreign Application Priority Data

Apr. 12, 2013   (TW) .............................. 102113026 A

(51) Int. Cl.
  *G06F 15/16*      (2006.01)
  *H04L 12/24*      (2006.01)

(52) U.S. Cl.
  CPC ........ *H04L 41/028* (2013.01); *H04L 41/0806* (2013.01); *H04L 41/0886* (2013.01)

(58) Field of Classification Search
  CPC   H04L 41/028; H04L 40/0806; H04L 41/0886
  See application file for complete search history.

(56) References Cited

U.S. PATENT DOCUMENTS

| | | | | |
|---|---|---|---|---|
| 8,082,491 | B1 * | 12/2011 | Abdelaziz | G06F 9/465 709/201 |
| 2006/0115089 | A1 * | 6/2006 | Carter | H04L 9/083 380/273 |
| 2007/0127500 | A1 * | 6/2007 | Maeng | H04L 63/10 370/395.52 |
| 2007/0140189 | A1 * | 6/2007 | Muhamed | H04W 48/14 370/338 |
| 2010/0299719 | A1 * | 11/2010 | Burks | G06F 9/44505 726/3 |
| 2011/0274029 | A1 * | 11/2011 | Connelly | H04W 24/02 370/315 |
| 2015/0016375 | A1 * | 1/2015 | Davis | H04W 72/0453 370/329 |

\* cited by examiner

*Primary Examiner* — Ryan Jakovac
(74) *Attorney, Agent, or Firm* — Bacon & Thomas, PLLC

(57) ABSTRACT

The present invention is to provide a network synchronization system, wherein a first network apparatus is connected to a physical line, stores a first profile at least including a Service Set Identifier (SSID), a pre-shared key and a channel, and can connect to the Internet according to the first profile and send out a detection message, and at least one second network apparatus is also connected to the physical line and can automatically generate a request message according to the detection message. When receiving the request message, the first network apparatus sends out the first profile in reply. Based on the first profile, the second network apparatus adds a second profile including the same SSID and pre-shared key but a different channel to itself, and then makes a seamless connection with the Internet through the physical line and the first network apparatus according to the second profile.

5 Claims, 4 Drawing Sheets

NETWORK SYNCHRONIZATION SYSTEM AND METHOD INVOLVING AUTOMATIC SETTING VIA PHYSICAL LINE

FIELD OF THE INVENTION

The present invention is to provide a network synchronization system, more particularly to a network synchronization system capable of enabling at least one second network apparatus to automatically make a seamless connection with the Internet through a physical line and a first network apparatus already connecting to the Internet.

BACKGROUND OF THE INVENTION

With the rapid development of computer hard- and software, and due to the prevalence of the Internet, many people have come to rely upon the Internet to do a lot of things in their daily lives, such as sending/receiving e-mails, communicating with one another, transferring files, and executing specific application programs (e.g., to watch Internet TV or view images taken by a surveillance camera). Therefore, the quality (e.g., data transfer rate and signal stability) of network services has gradually been viewed as an important indicator of the amenity of a place.

Generally, one who wishes to surf the Internet with a terminal device (e.g., a laptop computer, tablet computer, or smart phone) must begin by connecting the terminal device to a network apparatus (e.g., a router) either with a cable (e.g., an Ethernet cable) or wirelessly (e.g., through Wi-Fi signals). Then, the terminal device is connected to the Internet by the network connection function of the network apparatus. However, both Ethernet cables and Wi-Fi signals have their limitations in application. If the user is too far away from the network apparatus, it is physically impossible to connect the terminal device to the Internet, or a slow and jerky web browsing experience may result from weak network signals. To enable Internet connection from anywhere within a local area (e.g., an entire floor of an apartment or an entire café), extenders are required to extend network coverage. Two common types of extenders are bridges and brouters.

Application of extenders includes two major stages: hardware installation and software configuration. Take wireless bridges for example. A first bridge is connected to a network apparatus (i.e., a router) by an Ethernet cable, and a second bridge is positioned within the wireless transmission range of the first bridge (e.g., with the network apparatus located on the first floor, and the second bridge on the second floor) to complete hardware installation. Afterward, software configuration is carried out by setting the two bridges manually and separately according to a profile in the network apparatus. Only then can a terminal device be connected to the Internet through the bridges and roam seamlessly in the wireless transmission range of the two bridges. As the manual setting steps are complicated and require a basic understanding of network technologies, one who uses extenders for the first time or is required to perform software configuration in an unfamiliar network environment (e.g., in a foreign country) will have to spend a lot of time and energy in order to set up the extenders correctly. The onerous process not only compromises the convenience of extenders, but also presents a huge problem when it comes to commercial promotion of related products.

Besides, given the rising awareness of network security, it is not uncommon that a user changes the profile (e.g., password) of a network apparatus proactively to prevent theft of personal data, and each time the profile is changed, the settings of all the extenders connected to the network apparatus must also be changed, one extender after another, to ensure synchronized and seamless connection between the network apparatus and the extenders. However, the foregoing process is so complex that, should any data be wrongly set, the user has to check the network apparatus and each one of the extenders in order to fix the wrong setting, which is extremely inconvenient. Therefore, the issue to be addressed by the present invention is to design a network synchronization system in which extenders, such as bridges, can automatically capture the necessary profile upon completion of hardware installation and make successful network connection, thereby increasing convenience of use and enabling intuitive operation.

BRIEF SUMMARY OF THE INVENTION

In view of the fact that extenders such as bridges are conventionally required to be set by hand one after another, which is rather inconvenient, the inventor of the present invention conducted extensive research and numerous tests based on years of practical experience and finally succeeded in developing a network synchronization system and method involving automatic setting via a physical line. The present invention is intended to reduce the inconveniences of the prior art.

It is an object of the present invention to provide a network synchronization system and method involving automatic setting via a physical line. The network synchronization system includes a physical line (e.g., an Ethernet cable, a power cord, a MoCA (Multimedia over Coax Alliance) coaxial cable, or a composite network interface conforming to IEEE 1905.1), a first network apparatus (e.g., a gateway, a router, or a brouter), and at least one second network apparatus (e.g., a bridge or a like extender). The first network apparatus is connected to one end of the physical line and stores a first profile. The first profile at least includes a Service Set Identifier (SSID), a pre-shared key, and a channel. The first network apparatus can connect to the Internet according to the first profile and send out a detection message through the physical line. The at least one second network apparatus is connected to the opposite end of the physical line. The network synchronization method includes the following steps to be performed by each second network apparatus. To begin with, each second network apparatus receives the detection message through the physical line. Then, each second network apparatus generates a request message according to the detection message and sends the request message to the first network apparatus. The first network apparatus receives the request message of each second network apparatus and sends out the first profile in reply. Based on the first profile, each second network apparatus adds a second profile to itself, wherein the second profile includes the same SSID and pre-shared key as in the first profile but a different channel from the one in the first profile. Each second network apparatus is then connected to the Internet through the physical line and the first network apparatus according to the second profile. As each second network apparatus can, upon receiving the detection message sent by the first network apparatus, automatically send the request message to the first network apparatus to obtain the first profile and thereby enable a seamless connection with the first network apparatus, the network synchronization system features enhanced convenience in use and intuitive operation.

It is another object of the present invention to provide the foregoing network synchronization system and method, wherein the first network apparatus further stores a token. Once data in the first profile are passively changed (e.g., when the pre-shared key is changed by the user), the first network apparatus changes the token simultaneously. Moreover, the first network apparatus sends out the token together with the detection message through the physical line at a predetermined time interval. The network synchronization method also includes the following steps to be performed by each second network apparatus. Each second network apparatus receives the detection message and determines whether the token has been changed. If yes, each second network apparatus sends the request message to the first network apparatus once more to update the corresponding second profile in a timely manner.

BRIEF DESCRIPTION OF THE SEVERAL VIEWS OF THE DRAWINGS

The technical features as well as the process flow and further objects of the present invention will be best understood by referring to the following detailed description of some illustrative embodiments in conjunction with the accompanying drawings, in which.

DETAILED DESCRIPTION OF THE INVENTION

Figure 1:
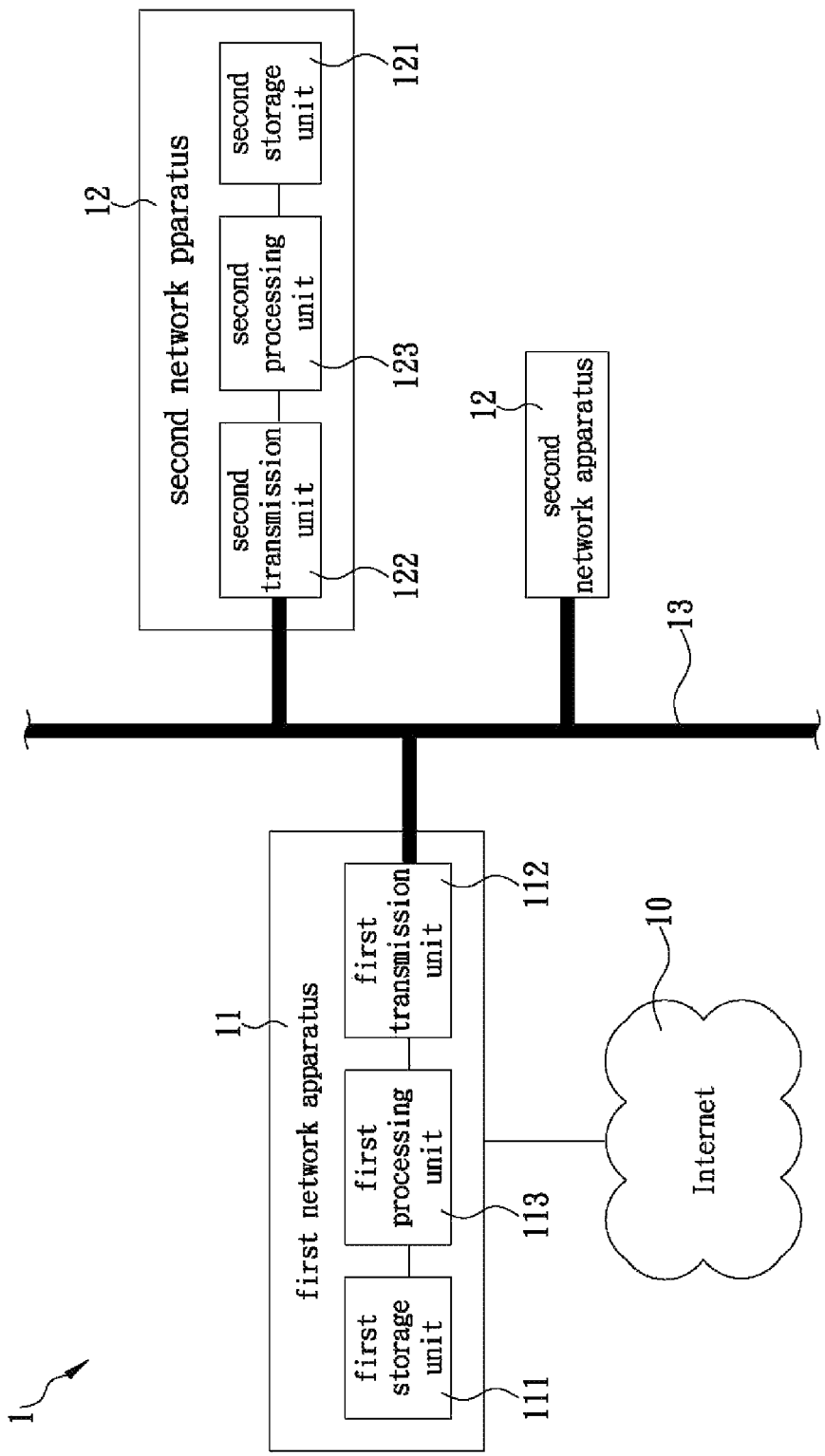
FIG. 1 schematically shows the network synchronization system according to the first preferred embodiment of the present invention.

The present invention discloses a network synchronization system and method involving automatic setting via a physical line. Referring to FIG. 1 for the first preferred embodiment of the present invention, the network synchronization system 1 includes a physical line 13, a first network apparatus 11, and at least one second network apparatus 12. The network synchronization method of the present invention serves mainly to enable the first network apparatus 11 to extend network signals outward via the physical line 13, with a view to creating a seamless network environment in which roaming is made easy. Hence, the transmission property of the physical line 13 is essential. The physical line 13, which may be an Ethernet cable, a power cord, or the like, is a coaxial cable in a preferred embodiment of the present invention, wherein the interface of the coaxial cable conforms to the specifications of either Multimedia over Coax Alliance (MoCA) or IEEE (Institute of Electrical and Electronics Engineers) 1905.1, and wherein data are transmitted through the coaxial cable by orthogonal frequency-division multiplexing (OFDM), also known as discrete multitone (DMT) modulation. A coaxial cable is chosen for use as the physical line 13 because it can effectively block noise interference and thereby ensure stable transmission.

Figure 2:
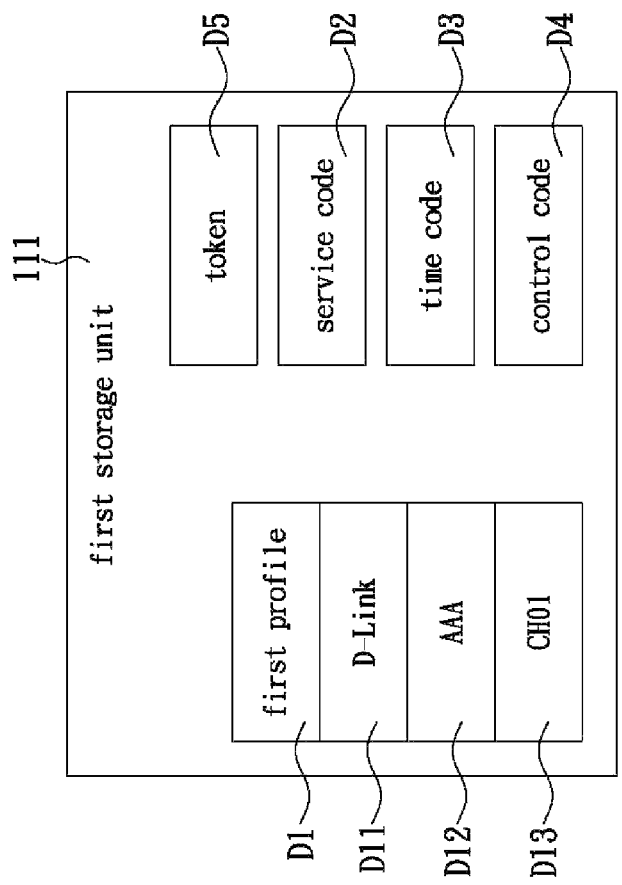
FIG. 2 schematically shows the first storage unit of the network synchronization system illustrated in FIG. 1.

The network apparatuses 11, 12 use protocols conforming to the specifications of IEEE 1905.1 or MoCA. Referring to FIG. 1 and FIG. 2, the first network apparatus 11 is provided therein with a first storage unit 111, a first transmission unit 112, and a first processing unit 113. The first storage unit 111 at least stores a first profile D1, wherein the first profile D1 includes a Service Set Identifier (SSID) D11 (e.g., the "D-Link" shown in FIG. 2), a pre-shared key D12 (e.g., the "AAA" shown in FIG. 2), and a channel D13 (e.g., the "CH01" shown in FIG. 2). The first transmission unit 112 is electrically connected to one end of the physical line 13 and can send out a detection message through the physical line 13 to determine if there is any other network apparatus connected to the physical line 13. The first processing unit 113 can connect to the Internet 10 according to the first profile D1.

Figure 3:
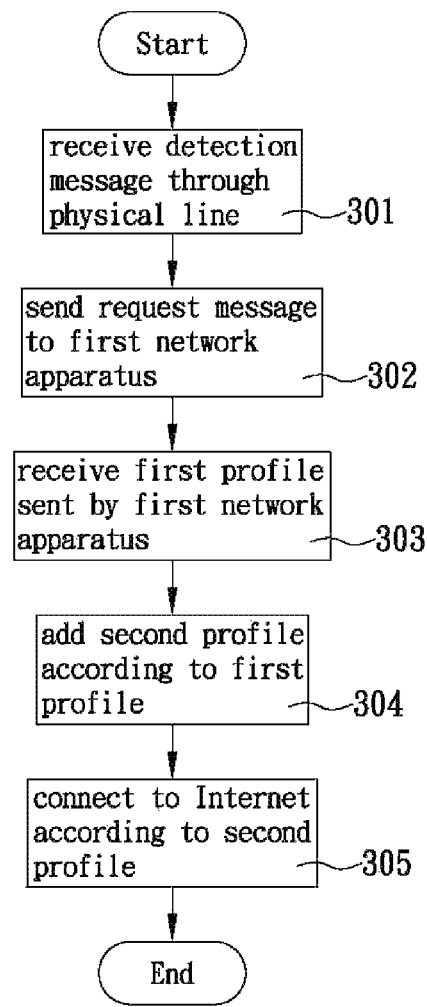
FIG. 3 is a flowchart of the network synchronization method according to the first preferred embodiment of the present invention.
Figure 4:
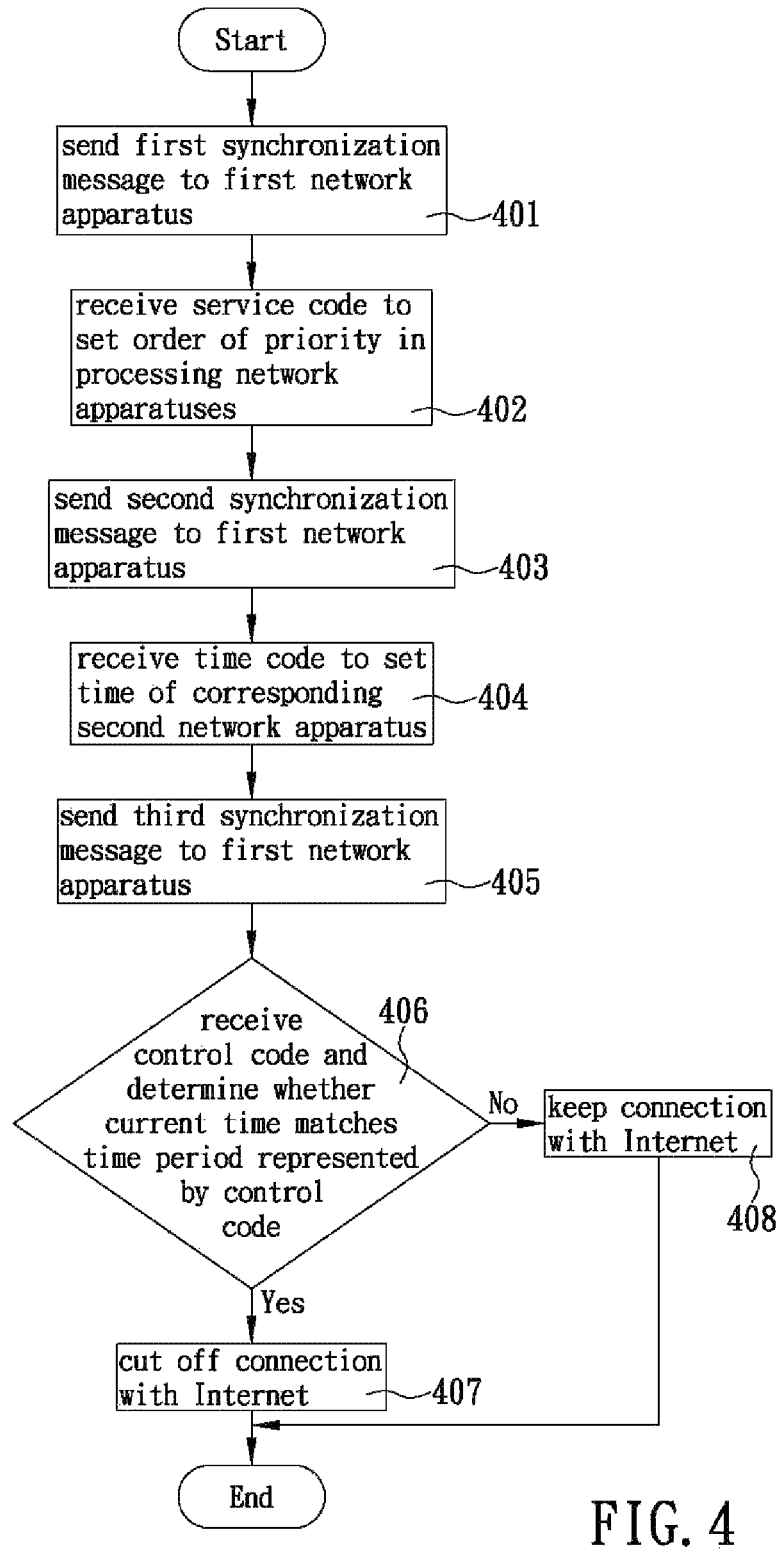
FIG. 4 is another flowchart of the network synchronization method according to the first preferred embodiment of the present invention.

Referring to FIG. 1~FIG. 3, each second network apparatus 12 is provided therein with a second storage unit 121, a second transmission unit 122, and a second processing unit 123, wherein the second transmission unit 122 is electrically connected to the other end of the physical line 13 while the second processing unit 123 is connected to the second storage unit 121 and the second transmission unit 122 separately. According to the network synchronization method of the present invention, the second processing unit 123 of each second network apparatus 12 performs the following steps after the first network apparatus 11 sends out the detection message through the physical line 13:

(301) Each second processing unit 123 receives the detection message through the corresponding second transmission unit 122 and the physical line 13.

(302) Each second processing unit 123 generates a request message according to the detection message and sends the request message to the first transmission unit 112 through the corresponding second transmission unit 122 and the physical line 13, so as for the first transmission unit 112 to send the first profile D1 to each second network apparatus 12 after receiving the request message sent thereby.

(303) Each second processing unit 123 receives the first profile D1 through the corresponding second transmission unit 122 and the physical line 13.

(304) Each second processing unit 123 adds a second profile to the corresponding second network apparatus 12 according to the first profile D1. More specifically, each second processing unit 123 sets the corresponding second profile in such a way that the SSID and pre-shared key in each second profile are the same as those in the first profile D1 (i.e., all the SSIDs being "D-Link", and all the pre-shared keys being "AAA") but the channel in each second profile is different from that in the first profile D1 (e.g., the channel in a certain second profile being "CH06" while the channel D13 in the first profile being "CH01"). The channels are set differently to prevent conflicts between the network apparatuses 11, 12.

(305) Each second processing unit 123 connects to the Internet 10 through the physical line 13 and the first network apparatus 11 according to the second profile.

Thus, upon connection to the physical line 13, each second network apparatus 12 receives the detection message of the first network apparatus 11 through the physical line 13 and automatically sends the request message to the first network apparatus 11 in response in order to obtain the first profile D1, thereby enabling the establishment of a seamless connection between the network apparatuses 11, 12. Hence, it is no longer necessary to manually set the network apparatuses one after another, and the network synchronization system 1 is more convenient to use and allows more intuitive operation than its prior art counterparts. Moreover, as the at least one second network apparatus 12 will each automatically choose a different channel, conflicts between the network apparatuses 11, 12 are prevented.

In the first preferred embodiment of the present invention, referring to FIG. 1~FIG. 4, the first storage unit 111 further stores a service code D2, a time code D3, and a control code D4. The service code D2 serves to set the order of priority between the network apparatuses 11, 12 in terms of signal processing. The time code D3 serves to unify the setting times of the network apparatuses 11, 12. The control code D4 represents a period of time (e.g., from 7 p.m. to 8 p.m.). According to the network synchronization method of the present invention, each second processing unit 123 performs the following steps after the corresponding second network apparatus 12 is connected to the Internet 10 according to the corresponding second profile:

(401) Each second processing unit 123 generates a first synchronization message according to the current network environment and sends the first synchronization message to the first network apparatus 11 through the corresponding second transmission unit 122 and the physical line 13, so as for the first network apparatus 11 to send the service code D2 to each second transmission unit 122.

(402) After receiving the service code D2, and based on the service code D2, each second processing unit 123 sets the order of priority in processing the network apparatuses 11, 12 (e.g., signals of the first network apparatus 11 will be processed first).

(403) Each second processing unit 123 sends a second synchronization message to the first network apparatus 11 through the corresponding second transmission unit 122 and the physical line 13, so as for the first network apparatus 11 to send the time code D3 to each second transmission unit 122 after receiving the corresponding second synchronization message.

(404) Upon receipt of the time code D3, and according to the time code D3, each second processing unit 123 sets a time parameter of the corresponding second network apparatus 12 by making the time parameter correspond to the first network apparatus 11.

(405) Each second processing unit 123 sends a third synchronization message to the first network apparatus 11 through the corresponding second transmission unit 122 and the physical line 13, so as for the first network apparatus 11 to send the control code D4 to each second transmission unit 122 after receiving the corresponding third synchronization message.

(406) Upon receipt of the control code D4, and according to the control code D4, each second processing unit 123 determines whether the current time matches the time period represented by the control code D4. If yes, go on to step (407); otherwise, go to step (408).

(407) Each second processing unit 123 cuts off connection with the Internet 10.

(408) Each second processing unit 123 keeps connection with the Internet 10.

Thus, by virtue of the synchronization messages generated according to the current network environment, each second network apparatus 12 is synchronized with the first network apparatus 11. It should be pointed out that the order of transmission of the service code D2, the time code D3, and the control code D4 can be adjusted as needed. In other words, the different synchronization messages D2~D4 generated by each second network apparatus 12 according to the current network environment may be transmitted in an order other than that shown in FIG. 4.

In other preferred embodiments of the present invention, a second network apparatus 12 which receives the detection message for the first time will not send out the request message automatically if the corresponding second processing unit 123 determines that the corresponding second storage unit 121 already stores a second profile. The second network apparatus 12 will not carry out the network synchronization method of the present invention until this second profile is removed by the user.

In addition, referring to FIG. 1 and FIG. 2, as the user may change the data in the first profile D1 (e.g., the pre-shared key D12) or adjust the values of the codes D2~D4 at any time, the first network apparatus 11 in the first preferred embodiment of the present invention further stores a token D5 which functions as follows. Whenever the data in the first profile D1 or the codes D2~D4 are changed, the first network apparatus 11 changes the token D5 simultaneously. Moreover, the first network apparatus 11 sends out the detection message and the token D5 together at a predetermined time interval as long as the first network apparatus 11 is connected to the physical line 13. When each second network apparatus 12 receives the detection message and the token D5, the corresponding second processing unit 123 determines whether the token D5 has been changed. (In this embodiment, each second network apparatus 12 stores the token D5 so that, each time a token D5 is received together with the detection message, the newly received token D5 can be compared with the stored token D5.) If the token D5 is determined as different, each second network apparatus 12 will send the request message to the first network apparatus 11 again to update the corresponding second profile.

The token D5 is designed to ensure that all the network apparatuses 11, 12 in the network synchronization system 1 use corresponding profiles. Even if the first profile D1 is adjusted while a certain second network apparatus 12 is not connected to the physical line 13, this second network apparatus 12 will, upon connection to the physical line 13, automatically synchronize with the first network apparatus 11 by means of the detection message and the token D5 sent by the first network apparatus 11. Thus, the network synchronization system 1 features great flexibility in use.

While the invention herein disclosed has been described by means of specific embodiments, numerous modifications and variations could be made thereto by those skilled in the art without departing from the scope of the invention set forth in the claims.

What is claimed is:

1. A network synchronization method involving automatic setting via a physical line, the network synchronization method being applicable to a network system, wherein the network system comprises the physical line, a first network apparatus, and a second network apparatus, wherein the first network apparatus is connected to an end of the physical line and stores a first profile, a token, a service code, a time code, and a control code representing a time period therein; wherein the first network apparatus is configured to change the token as soon as the service code or the time code is changed; wherein the first profile comprises a Service Set Identifier (SSID), a pre-shared key, and a channel and wherein the first network apparatus is connectable to the Internet according to the first profile and being configured for sending out the token together with a detection message through the physical line at a predetermined time interval and changing the token as soon as data in the first profile are changed, the second network apparatus being connected to an opposite end of the physical line, the network synchronization method comprising the steps, to be performed by the second network apparatus, of:

receiving, through the physical line, the detection message and the token sent by the first network apparatus;

storing the token and determining whether it is the first time to receive the token, or whether the token has been changed;

when determining that it is the first time to receive the token, or that the token has been changed, generating a request message according to the detection message and sending the request message to the first network apparatus, so as for the first network apparatus to send the first profile to the second network apparatus after receiving the request message;

adding a second profile to the second network apparatus according to the first profile, wherein the second profile comprises an SSID and a pre-shared key which are identical to the SSID and the pre-shared key in the first profile and a channel different from the channel in the first profile; and connecting to the Internet through the physical line and the first network apparatus according to the second profile;

wherein, once the second network apparatus is connected to the Internet according to the second profile, the second network apparatus further performs the steps of:

sending a synchronization message to the first network apparatus, so as for the first network apparatus to send the service code to the second network apparatuses after receiving the synchronization message, and setting a signal processing order of the network apparatuses according to the service code.

2. The network synchronization method involving automatic setting via a physical line, the network synchronization method being applicable to a network system, wherein the network system comprises the physical line, a first network apparatus, and a second network apparatus, wherein the first network apparatus is connected to an end of the physical line and stores a first profile, a token, a service code, a time code, and a control code representing a time period therein; wherein the first network apparatus is configured to change the token as soon as the service code or the time code is changed; wherein the first profile comprises a Service Set Identifier (SSID), a pre-shared key, and a channel and wherein the first network apparatus is connectable to the Internet according to the first profile and being configured for sending out the token together with a detection message through the physical line at a predetermined time interval and changing the token as soon as data in the first profile are changed, the second network apparatus being connected to an opposite end of the physical line, the network synchronization method comprising the steps, to be performed by the second network apparatus, of:

receiving, through the physical line, the detection message and the token sent by the first network apparatus;

storing the token and determining whether it is the first time to receive the token, or whether the token has been changed;

when determining that it is the first time to receive the token, or that the token has been changed, generating a request message according to the detection message and sending the request message to the first network apparatus, so as for the first network apparatus to send the first profile to the second network apparatus after receiving the request message;

adding a second profile to the second network apparatus according to the first profile, wherein the second profile comprises an SSID and a pre-shared key which are identical to the SSID and the pre-shared key in the first profile and a channel different from the channel in the first profile; and connecting to the Internet through the physical line and the first network apparatus according to the second profile;

wherein the first network apparatus further stores a time code and changes the token as soon as the time code is changed, and the network synchronization method further comprises the steps, to be performed by the second network apparatus once the second network apparatus is connected to the Internet according to the second profile, of:

sending a synchronization message to the first network apparatus, so as for the first network apparatus to send the time code to the second network apparatus after receiving the synchronization message; and making a time parameter in the second network apparatus correspond to the first network apparatus, according to the time code.

3. The network synchronization method involving automatic setting via a physical line, the network synchronization method being applicable to a network system, wherein the network system comprises the physical line, a first network apparatus, and a second network apparatus, wherein the first network apparatus is connected to an end of the physical line and stores a first profile, a token, a service code, a time code, and a control code representing a time period therein; wherein the first network apparatus is configured to change the token as soon as the service code or the time code is changed; wherein the first profile comprises a Service Set Identifier (SSID), a pre-shared key, and a channel and wherein the first network apparatus is connectable to the Internet according to the first profile and being configured for sending out the token together with a detection message through the physical line at a predetermined time interval and changing the token as soon as data in the first profile are changed, the second network apparatus being connected to an opposite end of the physical line, the network synchronization method comprising the steps, to be performed by the second network apparatus, of:

receiving, through the physical line, the detection message and the token sent by the first network apparatus;

storing the token and determining whether it is the first time to receive the token, or whether the token has been changed;

when determining that it is the first time to receive the token, or that the token has been changed, generating a request message according to the detection message and sending the request message to the first network apparatus, so as for the first network apparatus to send the first profile to the second network apparatus after receiving the request message;

adding a second profile to the second network apparatus according to the first profile, wherein the second profile comprises an SSID and a pre-shared key which are identical to the SSID and the pre-shared key in the first profile and a channel different from the channel in the first profile; and connecting to the Internet through the physical line and the first network apparatus according to the second profile;

sending a synchronization message to the first network apparatus, so as for the first network apparatus to send the control code to the second network apparatus after receiving the synchronization message; and cutting off connection with the Internet if the second network apparatus determines that a current time matches the time period, according to the control code.

4. A network synchronization system involving automatic setting via a physical line, comprising:

the physical line;

a first network apparatus comprising a first storage unit, a first transmission unit, and a first processing unit, wherein the first storage unit stores a first profile and a token therein, wherein the first profile comprises a Service Set Identifier (SSID), a pre-shared key, and a channel, wherein the token is changed by the first processing unit as soon as data in the first profile are changed, the first transmission unit being electrically connected to an end of the physical line so as to send a detection message together with the token through the physical line at a predetermined time interval, wherein the first processing unit is separately and electrically connected to the first storage unit and the first transmission unit and is connectable to the Internet according to the first profile; and wherein the first storage unit further stores a service code, the token is changed by the first processing unit as soon as the service code is changed, and the first transmission unit, upon receiving a synchronization message sent by the second transmission unit, sends the service code to the second network apparatus, so as for the second processing unit to set a signal processing order of the network apparatuses according to the service code; the first storage unit further stores a time code, the token is changed by the first processing unit as soon as the service code is changed, and the first transmission unit, upon receiving a synchronization message sent by the second transmission unit, sends the time code to the second network apparatus, so as for the second processing unit to set a time parameter according to the time code, making the time parameter correspond to the first network apparatus; and the first storage unit further stores a control code representing a time period, the token is changed by the first processing unit as soon as the control code is changed, and the first transmission unit, upon receiving a synchronization message sent by the second transmission unit, sends the control code to the second network apparatus, so as for the second processing unit to cut off connection with the Internet upon determining that a current time matches the time period;

a second network apparatus comprising a second storage unit, a second transmission unit, and a second processing unit, the second transmission unit being electrically connected to an opposite end of the physical line so as to receive the detection message and the token, the second processing unit being separately and electrically connected to the second storage unit and the second transmission unit so that, once the second transmission unit receives the detection message and the token and the second processing unit determines that it is the first time to receive the token, or that the token has been changed, the second processing unit sends a request message to the first network apparatus through the second transmission unit, causing the first network apparatus to send the first profile to the second network apparatus according to the request message; and once the second transmission unit receives the first profile, the second processing unit adds a second profile to the second storage unit according to the first profile, the second profile comprising an SSID and a pre-shared key which are identical to the SSID and the pre-shared key in the first profile and a channel different from the channel in the first profile, thus enabling the second network apparatus to connect to the Internet through the physical line and the first network apparatus according to the second profile.

5. The network synchronization system of claim 4, wherein the physical line is a coaxial cable, and signals are transmitted through the physical line by orthogonal frequency-division multiplexing (OFDM).

* * * * *